United States Patent [19]

Bergen et al.

[11] Patent Number: 5,046,086
[45] Date of Patent: Sep. 3, 1991

[54] PAGE-MAPPED MULTI-LINE TELEPHONE COMMUNICATION SYSTEM

[75] Inventors: Henry Bergen, Darien; Thomas R. Kelly, Milford; Edward J. Mazeiko, Jr., New Haven; Wellseley Smith, Stamford, all of Conn.

[73] Assignee: Contel IPC, Inc., Stamford, Conn.

[21] Appl. No.: 508,133

[22] Filed: Apr. 11, 1990

[51] Int. Cl.$^5$ .................... H04M 1/276; H04M 3/44
[52] U.S. Cl. .................................... 379/164; 379/165
[58] Field of Search ................. 379/164, 156, 157, 165

[56] References Cited

U.S. PATENT DOCUMENTS

4,817,132  3/1989  Chamberlin et al. ............ 379/164 X

*Primary Examiner*—Stafford D. Schreyer
*Attorney, Agent, or Firm*—Morgan & Finnegan

[57] ABSTRACT

There is disclosed a paged-mapped multi-line telephone communication system where a plurality of line selection keys can be paged to a central control module for an easier and more convenient operation. The operator has a view of all available lines and their status on various modules that are connected to the control module. The operator can select a line through a simplified pagination scheme. A set of lines represented on the auxiliary modules can be transferred to the control module where the operator selects the desired line by pressing the key corresponding to the line which was represented in the page transferred to the control module. To make an outgoing call, or to retrieve a call from another station from hold, the user would first depress the page key on the auxiliary module corresponding to the page or grouping in which the line representation resides.

19 Claims, 6 Drawing Sheets

DLAM CONFIGURATIONS

"C" DLAM — USED WITH CONTROL MODULE [8×20] ALONE

"E" DLAM — USED WITH CONTROL MODULE [4×40] AND EL MODULE

CONTROL MODULE TRANSMISSION
DMAC- DIRECT MEMORY ACCESS
CONTROLLER USED FOR
RAPID TRANSMISSION
OF DATA FROM MEMORY
TO INPUT/OUTPUT

PAGE-MAPPED MULTI-LINE TELEPHONE COMMUNICATION SYSTEM

This invention relates to multi-line telephone communications where a plurality of line selection keys can be paged to a central control module for easier and more convenient operation.

BACKGROUND OF THE INVENTION

Multiple-line key telephones, sometimes referred to as "trader turrets", have been widely used during the past decade in rapid communications networks such as trading operations in banks, brokerage houses, and other financial institutions. Telephones of this type provide direct access to several hundred outside lines with the simple depression of a single key on the telephone. Connections to the outside world may be established without dialing. Each telephone unit, also referred to as a telephone station, may be capable of selecting any one of several hundred different lines, and should at the same time provide all normal telephone functions, e.g., dialing, ringing, hold, etc.

Another important feature of multiple-line telephones is the provision in each telephone station for indicating the present status of each of the lines accessible at the particular station. This indication usually takes the form of a continuously lighted key for a "busy" line, a flashing key for a line on "hold" or for a "ring" on an incoming call, and a non-lighted key for a free line. In addition, the station should have the capability of indicating which line the user has picked up. The use of non-locking pushbutton keys requires some type of visual indication to allow the user to have information on all lines, particularly the line to which he is connected. An earlier turret system using non-locking pushbuttons is described in U.S. Pat. No. Re. 31,144 for "Multi-Station Telephone Switching System".

With considerable advances in technology the number of lines available to any one operator has increased tremendously. In order to fit all these keys in a system one solution is the use of a paging module where the operator can page through various selectable lines on the main or control station until the desired page is displayed. The operator can then press the corresponding button to establish a connection. This pagination feature allows the user to select and display different groups of line assignments known as "pages" from a pool of available numbers. The paging module usually has an electro-luminescent display similar to a display on a computer terminal. The module can display all the available lines in the system in a specific number of groups of lines. Each group of lines is called a page. The non-locking keys are aligned on the display such that there is a descriptor for each corresponding key. The descriptors that identify each line automatically change when a new page is selected.

With the pagination feature, the module allows the trader to have access to a great number of lines while taking up only a small amount of desk space. The trader can also conveniently operate with one module.

However, a problem encountered with the paging feature is that the operator is unable to view the status of a large number of lines at the same time. One possible way to solve this problem is constructing additional modules with all the lines and corresponding keys in place. The operator will then have a view of all the possible lines and their status. The operator can select a line by depressing the corresponding key on one of the additional modules. This solution, however, requires a considerable amount of space due to the large number of physical keys or buttons. Every station, therefore, will become very large, something which is not desirable in a trading floor or any other telephone communications application.

SUMMARY OF THE INVENTION

One of the objectives of this invention is to resolve all of the foregoing problems and considerations. In the page-mapped telephone communications system described herein, a dynamic line activity module (DLAM) is presented. The DLAM approach is a compromise which presents the status of a huge number of lines simultaneously. There are no corresponding keys or buttons for each line represented on a DLAM. Only line status and use indicators with corresponding descriptors are presented, allowing a huge number of line indications to fit in a relatively small space.

Access to outgoing calls is provided through a simplified pagination scheme. A set of lines on the DLAM is transferred to a central or control module where the operator selects the desired line by pressing the key corresponding to the line which was represented in the page transferred to the control or central module. Hence, by implementing the current invention the status of a large number of lines can be viewed at the same time without the need of a large space.

The present invention is adaptable to distributive logic, which minimizes the effect of unusual or unexpected equipment and component failures. This is achieved by making all incoming lines available to every telephone station. An internal failure at a particular telephone station does not interfere with the other stations. Similarly, telephone data processing may be handled on several individual "cards", each of which controls only a limited number (e.g. eight) of lines or telephone stations. Thus, a failure in a "line card" due to electrical overloading, for example, affects at most eight lines. In the event of a failure, all stations are capable of accessing all remaining outside lines. A failure in a "master card" would cause four telephone stations to be unusable, but all lines would remain operative from the remaining stations. In either case the malfunction is corrected by simply replacing the failed card.

In one preferred DLAM environment known as CDLAM, the module is divided into 8 groups, or pages, of 20 lines each. Associated with each group is a paging key. To make an outgoing call on a CDLAM, or to retrieve a call held by another turret, the user would first depress the page key on the CDLAM corresponding to the page or grouping in which the line resides. The 20 descriptors corresponding to the 20 lines in the page selected would instantly appear in the controller window, one descriptor for each of the twenty keys. The controller may be similar to the one described in a pending application, Ser. No. 06/883,295 or U.K. Patent No. 2,168,876. During the time that the twenty lines are being displayed on the controller module, all feature keys, including floating answer keys on the control module, are hidden from the user. The user will then depress the desired line key to select the line. The controller would then revert back to normal, with the twenty keys displaying their normal feature designation.

If after pressing a paging key on the CDLAM, the user fails to make a line key selection, the controller will revert back to normal mode in a few seconds.

Another means of displaying all the available telephone lines to a user is a Touch Screen Turret, alternately called the Touch Screen Module (TSM). The TSM is a touch screen user interface with the functionality of a control module and a display module The soft and hard buttons associated with the control and display modules would primarily appear as a soft touch screen on the display. A set number of keys with their corresponding descriptions are consolidated on the screen. The user by pressing the desired key on the screen may select a line or an available feature.

As will be better understood from the detailed description below of a preferred embodiment, the Dynamic Line Activity Modules transfer a page of line representations to a central controller by a push of a key allowing the user to operate from one module and at the same time have a view of the status of all the lines. The DLAMs are microprocessor controlled and can communicate with the control module through a "module bus".

Embodiments of the present invention will now be described, by way of example, with reference to the accompanying drawings, in which.

DETAILED DESCRIPTION

Figure 1:
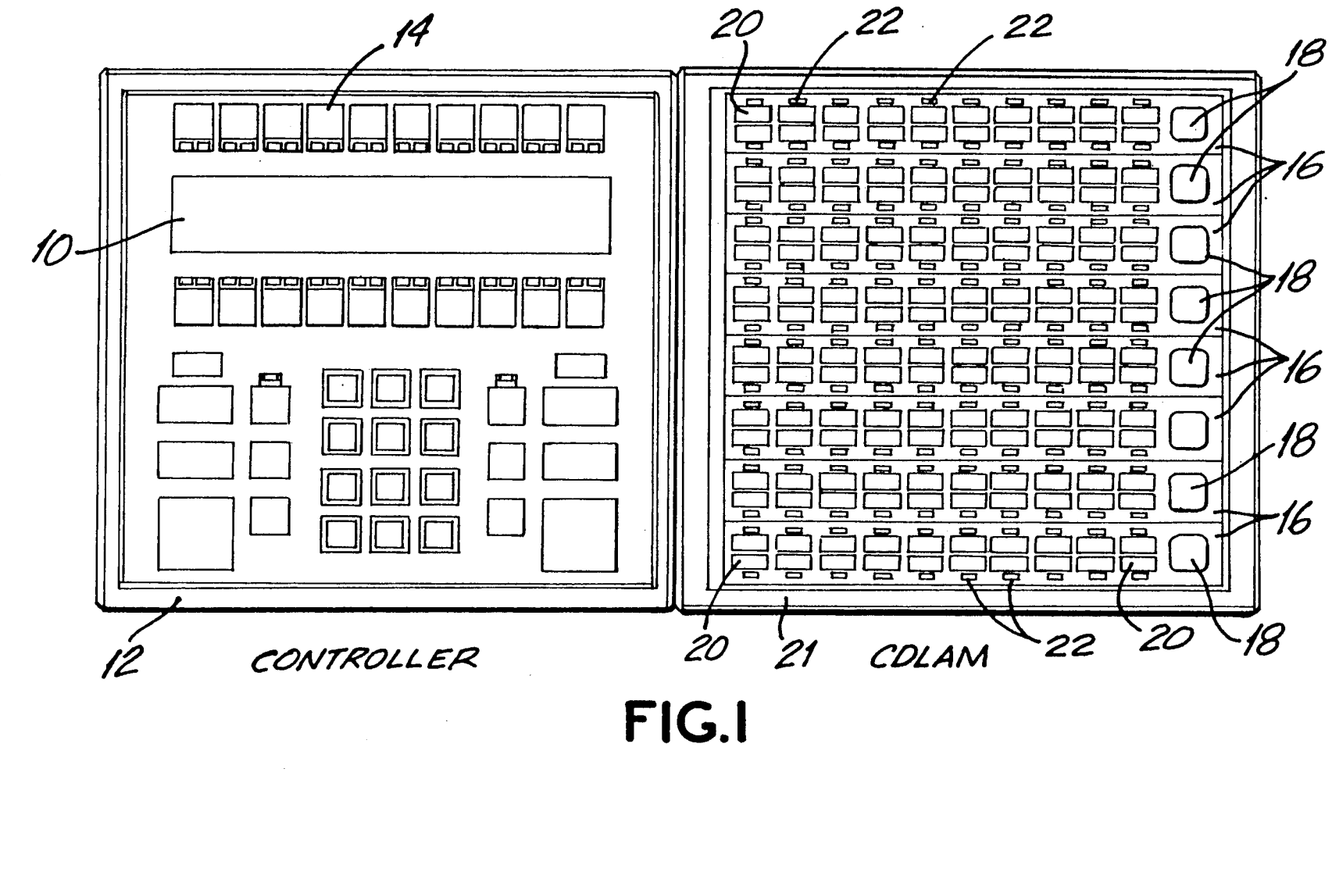
FIG. 1 is one embodiment of the present invention with a controller and a twenty-key-per-page Dynamic Line Activity Module.
Figure 2:
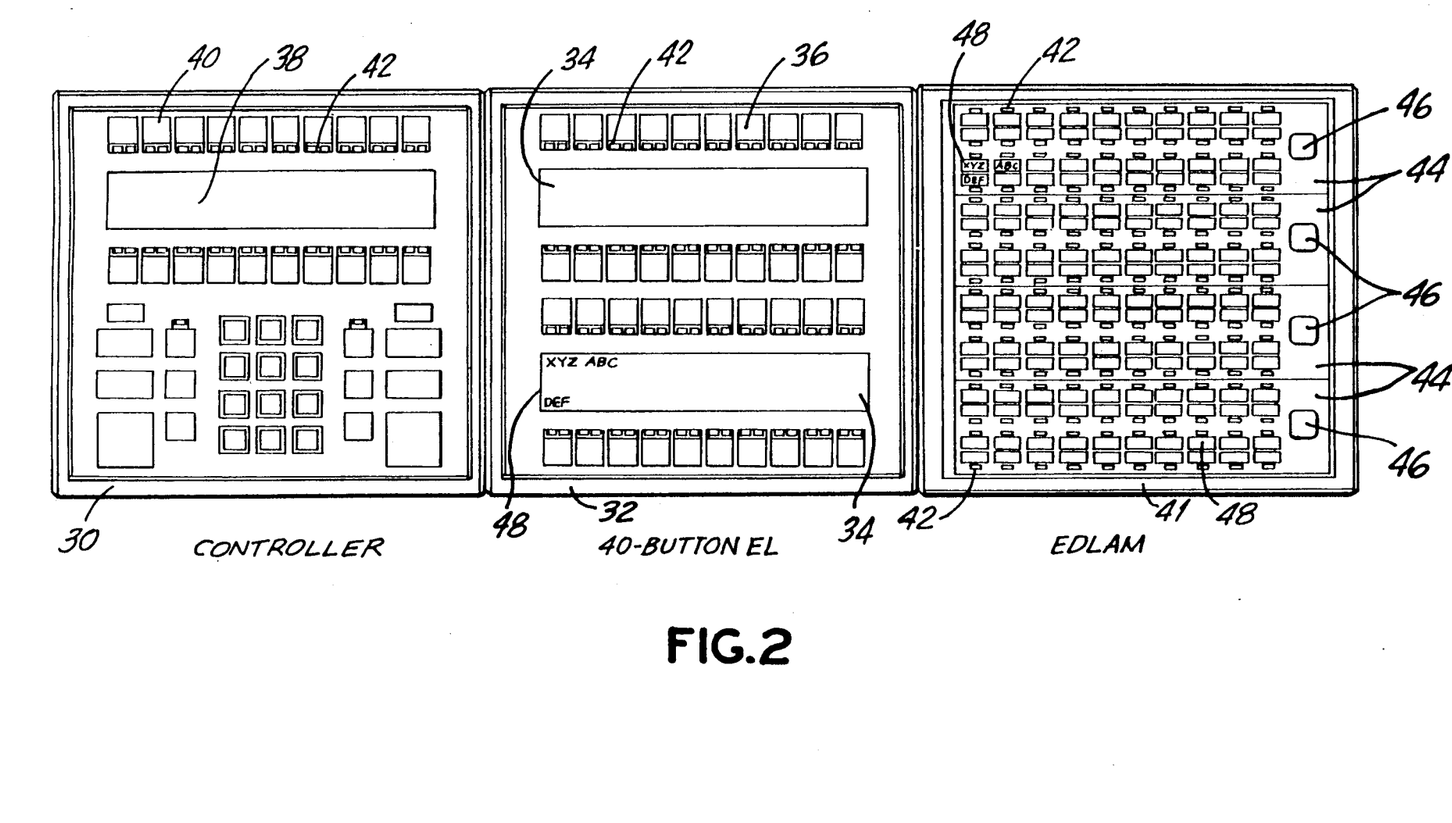
FIG. 2 is another embodiment of the present invention with a controller, a forty-button display module, and a forty-key-per-page Dynamic Line Activity Module.

In a preferred embodiment of the invention, the system components are distributed among several circuit cards containing a number of electronic elements. FIG. 1 and FIG. 2 both represent a different version of the present invention. FIG. 1 is one embodiment where the assigned pages are transferred to the display 10 present on the control module 12. The control module contains twenty function keys 14 that are programmable for performing various functions. The DLAM for the system represented by FIG. 1 is called "CDLAM". CDLAM 21 operates in conjunction with a controller module 12 like the one described in pending U.S. application Ser. No. 06/883,295, and G.B. Patent No. 2,168,876 and is incorporated by reference into this application. Incoming calls are answered as they appear on Floating Answer Keys in the controller module. CDLAM 21 is divided into eight page groups 16 of twenty lines per page. Access to each page is achieved by depressing the corresponding paging key 18. Therefore, each CDLAM 21 contains information for one-hundred-sixty available lines 20. The LEDs 22, which are usually red, are associated with each of the one-hundred-sixty line descriptors indicating the status of the particular line, using the following lamping protocols, which are:

1. Idle—lamp extinguished
2. Busy—lamp steady
3. Incoming—lamp flashes at 60 IPM (Interruptions per Minute)
4. Hold—lamp winks at 120 IPM.

FIG. 2 depicts another embodiment of the present invention called the "EDLAM". The EDLAM 41 operates in conjunction with a controller module 30 and a display module 32. The display module 32 has an electroluminescent display 34, and therefore is known as the EL-Module. The EL module has forty keys 36 associated with their corresponding descriptor 48 on the display 34. The controller 30 also has an electroluminescent display 38 with its associated twenty keys 40, each key corresponding to its appropriate descriptor on the display 38. Each key 40 and 36 is associated with dual color LEDs 42 which are usually red and green. The EDLAM 41 is divided into four page groups of forty lines per page. There are four paging keys on each EDLAM, each associated with a forty-line group. The EL module 32 has forty keys 36 or buttons, and the paging key 46 allows information transfer to those forty keys 36. The user is presented with two hundred lines simultaneously, one-hundred-sixty lines on the EDLAM 41, and the remaining forty on the EL Module 32. It is apparent that an operator using EL-module configuration has access to more lines at any given time without the necessity of paging.

The red LED 42 associated with each of the one-hundred-sixty line descriptors on the EDLAM 41 indicates the status of the particular line, in the manner described before for CDLAMS. These are:

1. Idle—lamp extinguished
2. Busy—lamp steady
3. Incoming—lamp flashes at 60 IPM
4. Hold—lamp winks at 120 IPM.

The status of lines on the EL Modules 32 is displayed in the same fashion as that for normal turret applications, using both the green and red LED 42 associated with each of the forty buttons. These are shown as follows:

1. Idle—Both green and red LEDs extinguished.
2. High Priority Incoming—Green LED flashes at 60 IPM and the red LED is extinguished.
3. Low Priority Incoming—Red LED flashes at 60 IPM and the green LED is extinguished.
4. I-Hold (a call is held by this operator station)—The green LED winks at 120 IPM and the red LED is extinguished.
5. Global Hold (a call is held by some turret other than this operator station)—Red LED winks at 120 IPM and the green LED is extinguished.
6. I-Use (line is in use by this operator)—The green LED is steadily illuminated and the red LED is extinguished.
7. Busy (line is in use by a turret other than this operator station)—The red LED is illuminated steadily and the green LED is extinguished.

Figure 3:
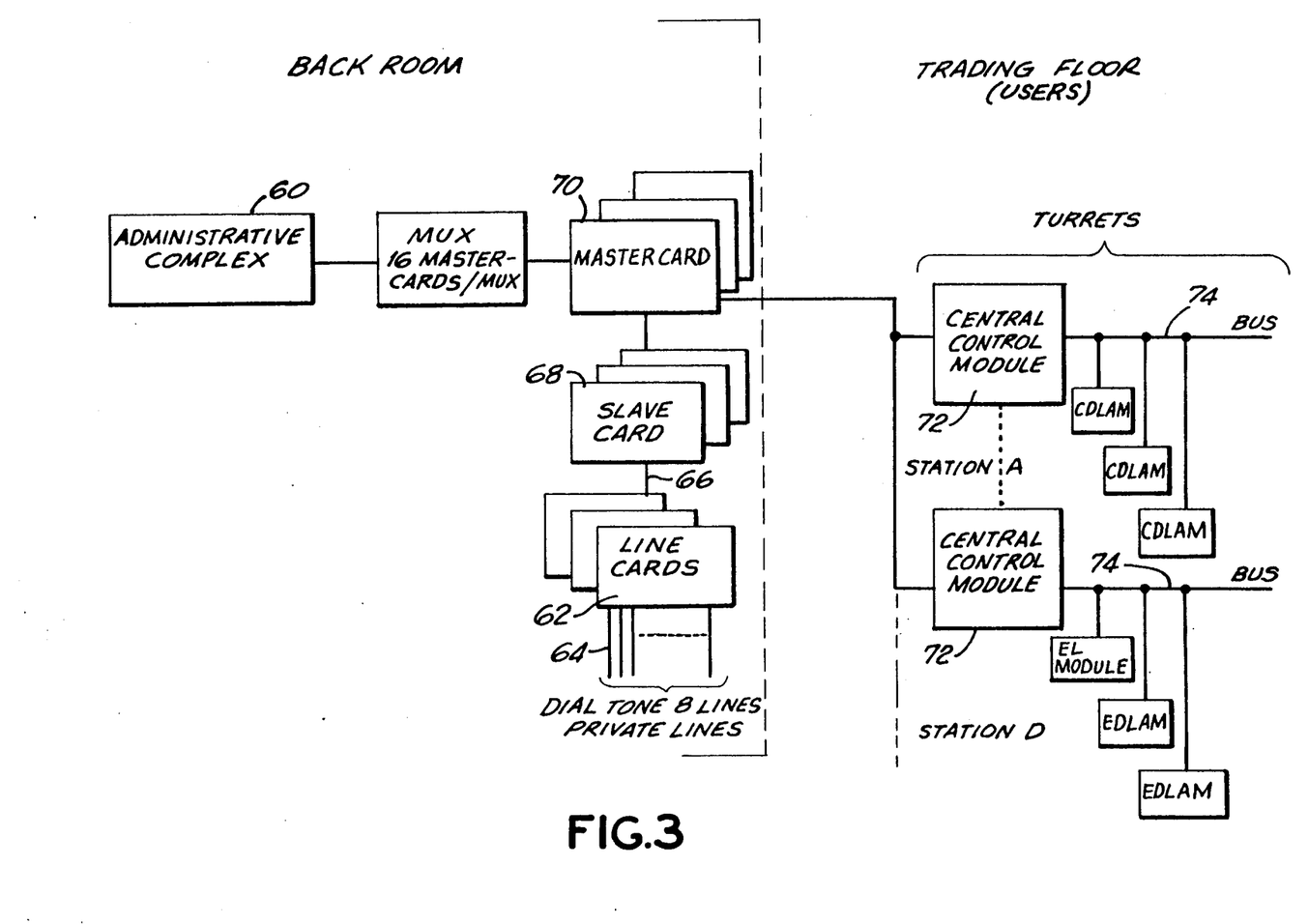
FIG. 3 is a system block diagram showing the back room equipment and the trading floor with the central controllers and corresponding DLAMs connected to them.

The LED colors associated with the line status described above will be fully programmable from the administrative complex 60 shown in FIG. 3. For example an operator may prefer that the I-use LED be red instead of green or prefer other similar changes.

FIG. 3 shows the system block diagram and the CDLAM or EDLAM in conjunction with the system. Line cards 62 each provide an interface between eight incoming external lines 64 and corresponding internal voice lines 66. In a typical case, the system is expandable in multiples of forty lines. Ten line cards are required for each group of eighty external lines to be served.

Referring again to FIG. 3 each group of eighty internal voice lines 66 is made available to each telephone station in the system via slave cards 68. Each slave card 68 is capable of connecting each of the forty voice lines 66 with any one of four telephone stations A, B, C, D. If more than four telephone stations are used, additional slave cards are required. In order for each of the stations A, B, C or D, to have access to additional lines, more slave cards and master cards 70 may be utilized. For the preferred embodiment described herein, up to ten slave cards, for a total of four hundred lines, are usable.

In FIG. 3, Master Card 70 services stations A–D. Each master card controls up to ten slave cards (i.e. up to 400 lines), where the actual switching of lines takes place. The master card organizes and processes (a) key press commands received from the stations and (b) status data received from the slave cards for transmission to the stations. The DLAMS are connected to Control Modules 72 via Module Bus 74.

Figure 4:
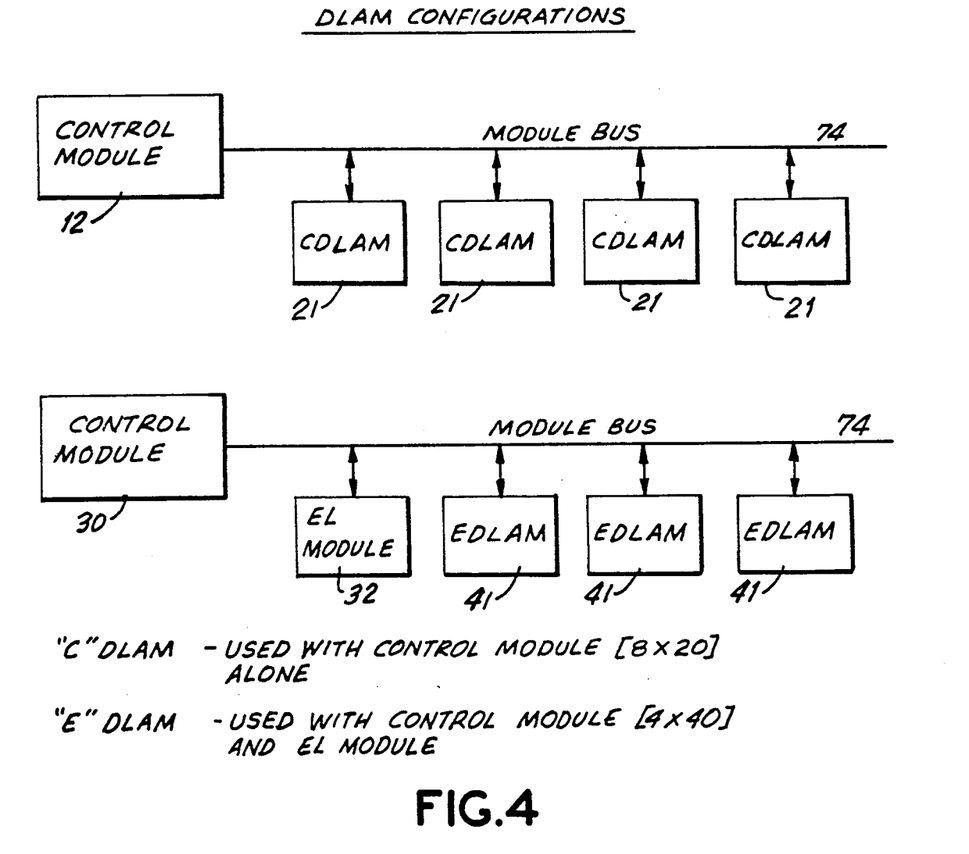
FIG. 4 is a system block diagram of various DLAM configurations within a station or turret.

FIG. 4 shows how a CDLAM 21 or EDLAM 41 may be connected to the control module. As it is shown, CDLAM 21 is used with a control module 12. As shown in FIG. 1, each CDLAM 21 has eight groups of twenty line pages [8 × 20]. As shown in FIG. 2, EDLAM 41 is used with a control module 30 and an EL Module. Control Modules 12 and 30 can be of similar or different types. Each EDLAM 41 has four groups of forty line pages [4 × 40] each.

Figure 5:
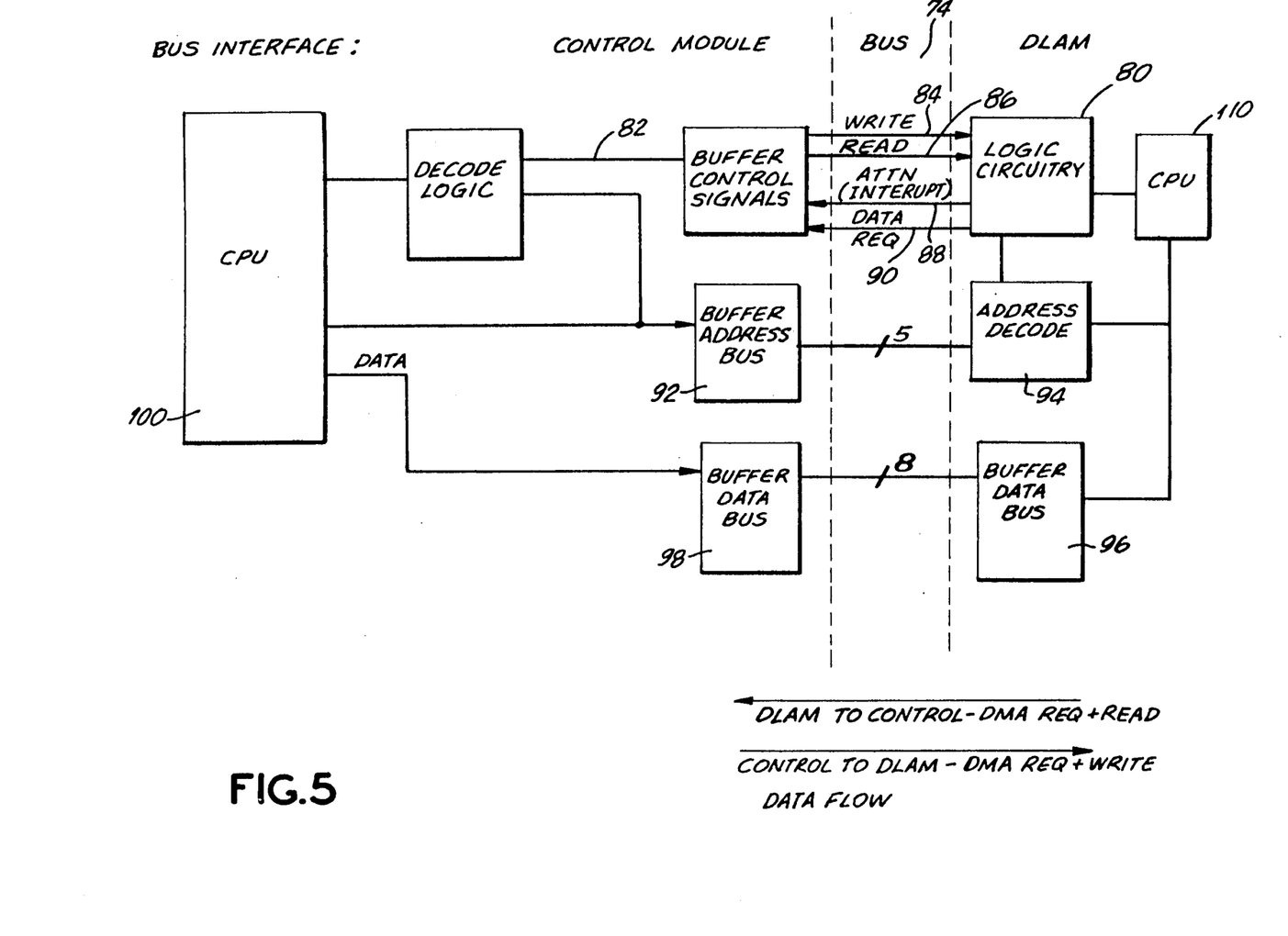
FIG. 5 is a block diagram of a bus interface depicting one way of communication between the control module and a DLAM.

In FIG. 5 details of how the controller module is connected to the DLAMS are shown. Both DLAM 80 and Control Module 82 are microprocessor controlled. The Module Bus 74 contains various connections for transfer of information flow. Line 84 carries the "Write" command. Line 86 carries the "Read" command. Lines 88 and 90 carry the interrupt command and the DMA (Direct Memory Access) command. Buffer Address Bus 92 is connected via five lines to address decoder 94. And Buffer Data Bus 96 is connected via eight lines to the buffer data bus 98 of the DLAM. When information has to be transferred from the control module 82 to an individual DLAM, the CPU 100 in the Control Module sends the proper DLAM address to the Buffer Address Bus 92. All DLAMS connected to the module bus 74 will receive the address and through their own address decoder 94 will recognize the desired DLAM with which the control module 82 is attempting to establish communication. Once the CPU of the DLAM is alerted, it allows for the flow of appropriate data from Buffer Data Bus 98 of the control module to Buffer Data Bus 96 of the DLAM. Conversely when a paging key in the DLAM is pressed, it causes an interrupt signal flow to the control module and alerts the CPU 100 of the Control Module of a DLAM requesting service.

Figures 6A, 6B:
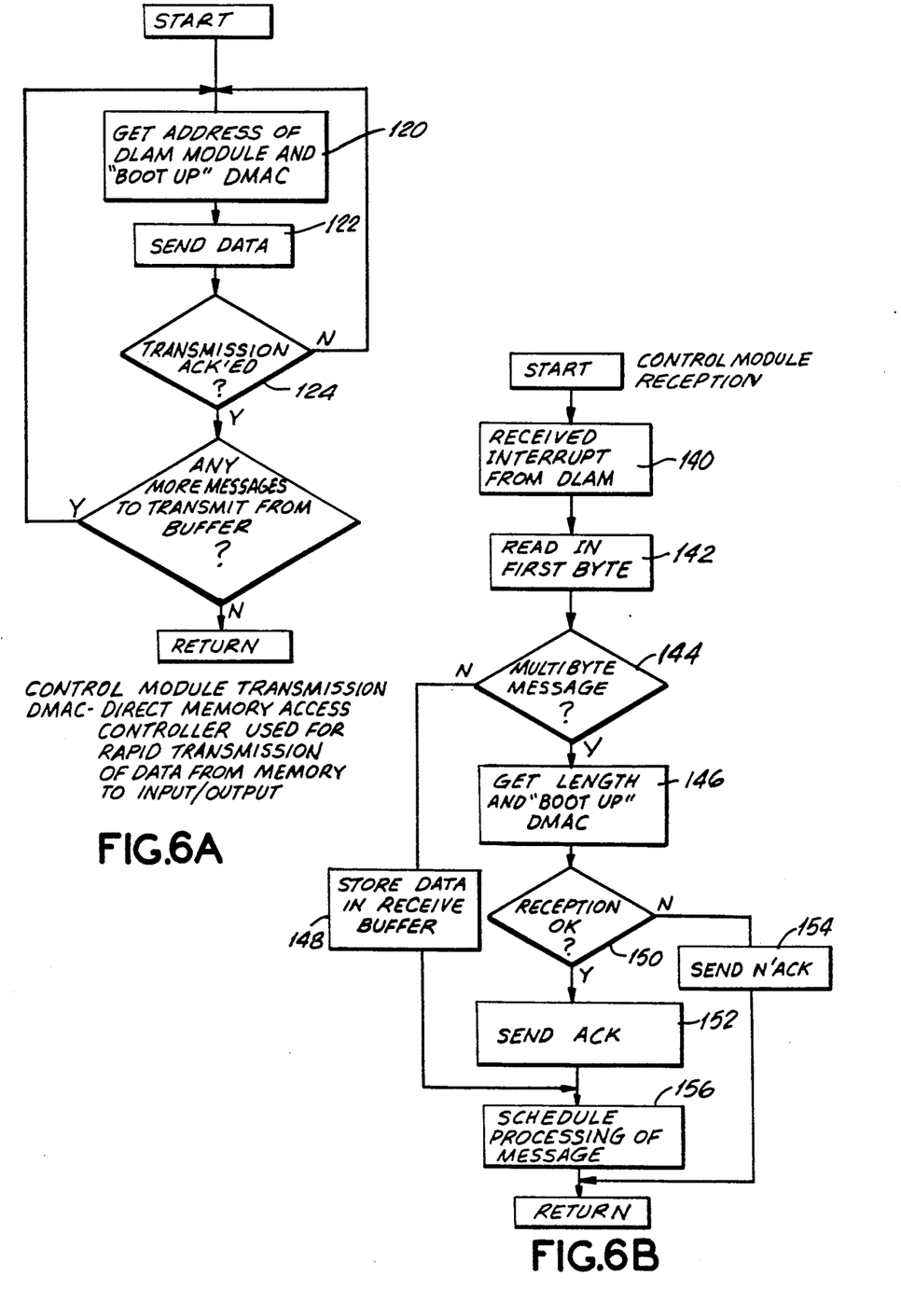
FIG. 6A is a flow chart describing basic communication between control module and DLAM.
FIG. 6B is a flow chart describing basic communication between DLAM and control module.

FIG. 6A shows the flow chart of the data flow described above. Specifically, it shows transmission from control module to a particular DLAM module. The first step 120 in such a transmission is to get the address of DLAM module and "Boot Up" Direct Memory Access Controller. The Direct Memory Access Controller is used for rapid transmission of data from memory to input/output. Once this step 120 is accomplished, the next step 122 is to send data to the corresponding DLAM. The control module in the next step 124 waits for acknowledgment of the data from the DLAM. If at step 124 data reception has been acknowledged, the Control Module will move to the next step 126 to check if there are any more messages to transmit; if so, the control module operation will revert back to step 120 for the next available data. If there are no more available messages, the control module ends the transmission. If at step 124 data reception has not been acknowledged, then an error has occurred and the control module will revert back to step 120 to resend the data to the DLAM.

FIG. 6B shows the flow chart of data flowing from a DLAM to the control module. The control module at step 140 will receive an interrupt from DLAM. This interrupt signal is sent from a DLAM that requires attention. At step 142 the control module will read the first byte of the message. At step 144 the control module decides whether the message is a multi-byte message or not; if so, the control module will skip to the next step 146 and get the length of the message and at the same time "Boot Up" the direct memory access controller. If the message at step 146 does not have multiple bytes, the control module will go to step 148 to store data in the receive buffer. From there on, the control module at step 156 will schedule processing of the message. At step 150 the control module decides whether the reception for the DLAM was complete. If yes, the control module will send an acknowledge signal at step 152 and move to step 156 to schedule processing of the multiple-byte message If at step 150 the control module decides that the reception from DLAM was not complete, at step 154 the control module will send a not-acknowledged signal to the DLAM and return to normal operation. After acknowledged messages at step 156 have been scheduled for processing, the control module will revert to its normal operation.

The format for various messages will be explained in more detail herein. There are various messages that the controller module transmits to the DLAMS. The DLAM will be receiving line status over the module bus. There will be five message types used in the controller to DLAM transmission scheme as follows:

1. Button Assignment
2. Line Status
3. Module Configuration (The DLAM will be smart enough to distinguish between 20 and 40 button paging.)
4. Diagnostics
5. Error Status
6. Button Status The Button Assignment message format is required so that the DLAM can associate the line status with the button numbers displayed. Upon power up, the DLAM will receive the button assignments for all buttons on all the DLAMS in the system from the Control Module From then on the DLAM will receive button assignment changes only. The button message format is: BYTE COUNT', COMMAND', SEQUENCE #', 1ST BUTTON #', TYPE', LINE #', DESCRIPTOR', 2ND BUTTON #', TYPE', LINE #', DESCRIPTOR', AND CHECK SUM'.

BUTTON # length is 2 bytes, the LOW byte sent first, and the HIGH byte second. DESCRIPTOR length is 8 bytes, and all others are 7 bytes long. The BYTE COUNT byte indicates the length of the message including the CHECKSUM. The SEQUENCE # byte is left in the message to limit the amount of processing time required to remove this field. This field is reset to zero for this message type and will be ignored by the DLAM.

As shown above, the DLAM will receive button assignments for two buttons at a time. In the case of a single button change, the entire second button field will contain zeros, and the CHECKSUM is appended at the end and will contain the exclusive or'ing of the command through data fields. This is similar to the Master card transmission to the control module.

The line status message is transmitted to each DLAM at regular intervals. Each transmission will contain the status for 80 lines and contains: BYTE COUNT', COMMAND', SEQUENCE #', 80 LINE STATUS' AND CHECKSUM'. 80 LINE STATUS length is twenty bytes, all others are one byte in length. Each byte in the 80 LINE STATUS will contain the status for FOUR lines—two bits per line. SEQUENCE NUMBER is the byte indicating which two slaves the 80 lines are assigned to, as shown below:

| Sequence Number | Slave Cards |
|---|---|
| 0 | 1 & 2 |
| 1 | 3 & 4 |
| 2 | 5 & 6 |
| 3 | 7 & 8 |
| 4 | 9 & 10 |

The format for the module configuration message is: BYTE COUNT', COMMAND', STARTING BUTTON #', CONFIG', and CHECKSUM' The STARTING BUTTON field represents the button assigned to the first lamp. This will provide the DLAM with a cross reference between the button assignments and the line status. The DLAM will assign button numbers to the remaining lamps. This message will also provide configuration information to the DLAM in the CONFIG field. This message will be sent only during power-up. All segments except one are of one byte length. The STARTING BUTTON contains a number between 1 and 600 (decimal), and is two bytes long. The CONFIG field is broken down in binary as:

x' x' x' x' x' x' x' LAMP RATE' where x = unused, and the LSB is the LAMP RATE. The LAMP RATE bit will indicate how to use the fast and slow clock rates. In the preferred embodiment of the current invention 0 = flash at 60 Hz, wink at 120 Hz and 1 = flash at 120 Hz, wink at 60 Hz. This allows for U.K. signalling requirements which are opposite to other countries.

The diagnostics message contains: BYTE COUNT', COMMAND', DIAGNOSTIC TEST' and CHECKSUM'. This command will inform the DLAM to invoke RAM, ROM and other tests. The diagnostic tests Hex codes are:

| Test | Hex Code |
|---|---|
| 1. RAM | 00 |
| 2. ROM | 01 |
| 3. BUTTON | 03 |
| 4. LED | 04 |

The format for ERROR STATUS message is a multibyte message that is sent to the DLAM when the controller receives bad data from the DLAM. This error code message will tell the DLAM to retransmit its last message. This will only apply to multibyte messages that were received (i.e. key numbers presently received from button modules). The two status messages defined are:

| Condition | Hex Code |
|---|---|
| ACK | 00 |
| NACK | 01 |

The Error Message contains: BYTE COUNT, COMPOUND, DATA and CHECKSUM. All fields are one byte in length and the DATA field will contain the status. This DATA field can be upgraded to indicate why a message was NACK'ed, such as improper byte count or checksum. This can be a future enhancement if necessary.

| EDLAM | −03H |
| CDLAM | −04H |
| TSM (Touch Screen Module) | −05H |

All hardware, timing, etc., may be changed in the button modules to increase speed and reliability on the module bus. According to the best embodiment in this invention, the button module polls its buffer for messages from the controller module. It is also possible to make a design change in order to have a protocol interrupt driven on the button module's end.

DLAM TO CONTROLLER TRANSMISSION

This protocol is similar to the one presently used over the module bus and is backward compatible with the existing modules. The messages are of the single and multibyte variety:

| Function | Length | Hex Code |
|---|---|---|
| EL/PCD Key Number | Single | n/a |
| Error Status | Single | n/a |
| Who Am I? | Single | n/a |
| Button Number | Multi | 00 |
| DLAM Key # | Multi | 01 |
| Diagnostics Report | Multi | 02 |

The module type shall be four bits long. The single byte message format is:

KEY/MSG' ERR/PWR' O' TYPE' TYPE' TYPE' TYPE' MULTI/SNGL'

The Error Status Message can be expanded to five bits. Only bit 1 is being used presently for ACK (reset) and NACK (set) as follows:

MSG' ERR' S' T' A' T' US' SNGL'

The Diagnostics Report Message informs the controller module of RAM/ROM tests, etc. The diagnostics message is a multibyte message which matches the design as described under the "Diagnostic Test" message. The message contains: BYTE COUNT', COMMAND', DIAGNOSTIC REPORT', DATA' and CHECKSUM'. The Diagnostic Report field contains one byte, and indicates the diagnostic test performed as follows:

| Test | Hex Code |
|---|---|
| RAM | 00 |
| ROM | 01 |
| VERSION # | 02 |
| CHECKSUM | 03 |

In the RAM and ROM tests the most significant bit, MSB, of the byte will indicate a 0/1 for a pass/fail condition, respectively. Version # and checksum can be sent for delay purposes. The data field will contain the checksum or version in ASCII format and can be variable in length.

DLAM key # is a number (0–7) which will represent the page keys on the DLAM. The message contains: BYTE COUNT', COMMAND', DLAM KEY #', AND CHECKSUM'. This message notifies the controller module of which page to display.

Although the invention has been described with reference to a couple of preferred embodiments, it should be understood that other embodiments are possible and the system need not employ the identical elements or steps described herein. Other arrangements of specific elements or steps are possible within the scope of this invention. As a specific alternative, the sequential order of the specific data communicating steps, as well as the data format, would be changed or altered. The manner in which data is read into the system can also be altered without necessarily adversely affecting the system operation.

We claim:

1. In a telephone system wherein voice communication is available through any one of the plurality of external lines at any one of several operator stations said telephone system providing external line station information and single key line selection at each operator station the improvement comprising:
   a dynamic line activity module including a line description display of all said external liens in a page group type organization, said page group description transferrable to a display module having a line selection switch.

2. The invention, as recited in claim 1, wherein the display module further comprises:
   a plurality of keys, a central control display means, said keys programmably designated with a plurality of telephone lines, said designation displayable on said control display means.

3. The invention, as recited in claim 2, further comprising an LED display associated with each key and line descriptor, said LED display having a first and second color indication, said first and second color indicators informing of the status of each line, priority of incoming calls, and active line indication.

4. The invention, as recited in claim 2, wherein the display module has forty keys and the line descriptor display of said line activity module is divided into four page groups, each page group having forty line descriptor means.

5. The invention, as recited in claim 2, wherein the display module has twenty keys associated with central control display and the line descriptor of said line activity module is divided into eight page groups, each page group having twenty line descriptor means.

6. A multi-line telephone activity monitor with page select capability comprising:
   a central control module having a plurality of keys, a central control display means, and telephone communication means, said keys being programmably designated with a plurality of telephone liens, said designation displayable on said control display means;
   a display button module having a display means and a plurality of programmable keys for selecting a plurality of telephone lines designated to each of said keys, said designation being displayed on said display means, said display button module connected to said control module; and
   a line activity module having a plurality of line descriptor means indicating the designation of each line available in the system, said line descriptor means divided into a plurality of line groups, each line group having the same number of line descriptors as the number of keys on the display button module means, said line activity module having a paging key associated with each such group of said line descriptors, for transferring the group of lines corresponding to said paging key to the display button module when said paging-key is activated, said line activity module being connected to said control module and said display button module.

7. A multi-line telephone activity monitor with page select capability comprising:
   a central control module having a plurality of keys, a central control display means, and telephone communication means, said keys being programmably designated with a plurality of telephone liens, said designation being displayable on the control display means;
   a line activity module having a plurality of line descriptor means indicating the designation of each line available in the system, said line descriptor means divided into a plurality of groups, each line group having the same number of line descriptors as the number of keys on the central control module, said line activity module having a paging key associated with each such group of said line descriptor means, for transferring the group of lines corresponding to said paging key to the control module when said paging-key is activated, said line activity module being connected to said control module.

8. A multi-line telephone activity monitor with page select capability, as claimed in claim 6, further comprising:
   an LED display associated with each key and line descriptor of said display button module, said LED display having a first color indication and a second color indication, said first color and second color indicators, informing status of each line, priority of incoming calls, and active line indication.

9. The invention as cited in claim 8, further comprising:
   an LED display associated with each line descriptor of said line activity module, said lED display having a color indication, said color indicator informing the status of each line.

10. A multi-line telephone activity monitor with page select capability, as claimed in claim 7, further comprising:
    an LED display associated with each key and each displayable line designation of said control module, said LED display having a first color indication and a second color indication, said first and second color indicators informing status of each line, priority of incoming calls, and active line indication.

11. The invention, as cited in claim 10, further comprising:
an IED display associated with each line descriptor of said line activity module, said LED display having a color indication, said color indicator informing status of each line.

12. A multi-line telephone activity monitor with page select capability, as claimed in claim 8, wherein:
said first color is red and said second color is green; and
an idle line being represented by both green and red LEDs extinguished;
a high priority incoming line being represented by a flashing green LED at 60 IPM and red LED being extinguished;
a low priority incoming call being represented by a flashing red LED at 60 IPM and green LED being extinguished;
an I-Hold being represented by a green LED winking at 120 IPM and the red LED being extinguished;
a global hold wherein a call is held by some station other than the user's, represented by a winking red LED at 120 IPM and the green LED being extinguished;
I-Use, wherein a line being in use by the operator, being represented by green LED steadily illuminated and red LED extinguished; and
Busy, wherein a line being in use by a turret other than the one operated, being represented by red LED being steadily illuminated and green LED being extinguished.

13. A multi-line telephone activity monitor with page select capability as claimed in claim 10 wherein:
said first color is red and said second color is green; and
an idle line being represented by both green and red LEDs extinguished;
a high priority incoming line being represented by a flashing green LED at 60 IPM and red LED being extinguished;
a low priority incoming call being represented by a flashing red LED at 60 IPM and green LED being extinguished;
an I-Hold being represented by a green LED winking at 120 IPM and the red LED being extinguished;
a global hold wherein a call is held by some station other than the user's, represented by a winking red LED at 120 IPM and the green LED being extinguished;
I-Use, wherein a line being in use by the operator, being represented by green LED steadily illuminated and red LED extinguished; and
Busy, wherein a line being in use by a turret other than the one operated, being represented by red LED being steadily illuminated and green LED being extinguished.

14. A multi-line telephone activity monitor with page select capability, as claimed in claim 6 further comprising:
a timing means, for measuring a predetermined period of time, wherein group of liens transferred to the display button module from the line activity module, are transferred back to the line activity module, after said predetermined period of time, when no further action is accomplished after depressing the paging key.

15. A multi-line telephone activity monitor with page select capability, as claimed in claim 7, further comprising:
a timing means, for measuring a predetermined period of time, wherein group of liens transferred to the display button module form the line activity module, are transferred back to the line activity module, after said predetermined period of time, when no further action is accomplished after depressing the paging key.

16. A multi-line telephone activity monitor with page select capability, as claimed in claim 6, wherein the display button module has forty keys, and the line descriptor means of said line activity module is divided into four groups, each group having forty line descriptor means.

17. A multi-line telephone activity monitor with page select capability, as claimed in claim 7, wherein the central control module has twenty keys associated with the central control display means and the line descriptor means of said line activity module is divided into eight groups, each group having twenty line descriptor means.

18. A multi-line telephone activity monitor with page select capability, as claimed in claim 16, wherein the line descriptor means is an electroluminescent display.

19. A multi-line telephone activity monitor with page select capability, as claimed in claim 17, wherein the line descriptor means is an electroluminescent display.

* * * * *